United States Patent
Elliott, Sr.

[11] Patent Number: 6,026,985
[45] Date of Patent: Feb. 22, 2000

[54] FOOD DISPENSER GUN

[75] Inventor: Dennis Keith Elliott, Sr., Madison, Miss.

[73] Assignee: Robot-Coupe U.S.A., Inc., Jackson, Miss.

[21] Appl. No.: 08/314,146

[22] Filed: Sep. 28, 1994

[51] Int. Cl.⁷ .................................................. G01F 11/00
[52] U.S. Cl. ................ 222/1; 222/153.01; 222/326; 222/391; 426/115; 426/516
[58] Field of Search ............... 222/153.01, 158, 222/325, 326, 386, 391, 309; 426/115, 516

[56] References Cited

U.S. PATENT DOCUMENTS

| | | |
|---|---|---|
| 1,397,510 | 11/1921 | Grassi . |
| 1,630,846 | 5/1927 | Holst .................................. 222/391 X |
| 1,886,022 | 11/1932 | Hutton .................................. 222/309 |
| 1,996,628 | 4/1935 | Schneider .................................. 107/52 |
| 2,115,591 | 4/1938 | Sherbondy .................................. 18/3.5 |
| 2,180,978 | 11/1939 | Crewe .................................. 74/169 |
| 2,234,432 | 3/1941 | Gallo .................................. 107/52 |
| 2,617,560 | 11/1952 | Peitrzak .................................. 222/391 X |
| 2,626,731 | 1/1953 | Ekins .................................. 222/470 |
| 2,634,692 | 4/1953 | Sherbondy .................................. 107/52 |
| 2,670,881 | 3/1954 | Sjoblom .................................. 222/289 |
| 2,743,044 | 4/1956 | Deemer et al. .................................. 222/323 |
| 2,884,877 | 5/1959 | Nalbone et al. .................................. 222/391 |
| 2,928,533 | 3/1960 | Loucony .................................. 206/16 |
| 3,473,682 | 10/1969 | Studen . |
| 3,750,913 | 8/1973 | Wild .................................. 222/387 |
| 3,894,663 | 7/1975 | Carhart et al. .................................. 222/309 |
| 4,072,256 | 2/1978 | Cox .................................. 222/391 |
| 4,081,112 | 3/1978 | Chang .................................. 222/391 |
| 4,090,639 | 5/1978 | Campbell et al. .................................. 222/43 |
| 4,268,567 | 5/1981 | Harmony .................................. 428/195 |
| 4,282,279 | 8/1981 | Strickland .................................. 428/101 |
| 4,330,070 | 5/1982 | Doubleday .................................. 222/43 |
| 4,478,265 | 10/1984 | DeMarco .................................. 150/52 |
| 4,871,597 | 10/1989 | Hobaon .................................. 428/36.1 |
| 4,899,909 | 2/1990 | Summons et al. .................................. 222/158 X |
| 4,948,016 | 8/1990 | Summons et al. .................................. 222/158 |
| 4,966,537 | 10/1990 | Bowles et al. .................................. 425/87 |
| 5,109,588 | 5/1992 | Hewlett et al. .................................. 29/525.1 |
| 5,163,608 | 11/1992 | Block .................................. 229/92.8 |
| 5,192,008 | 3/1993 | Hwan .................................. 222/391 |

FOREIGN PATENT DOCUMENTS

| | | |
|---|---|---|
| 837942 | 3/1970 | Canada .................................. 222/391 |
| 156022 | 9/1956 | Sweden .................................. 222/391 |
| 1011470 | 12/1965 | United Kingdom .................................. 222/391 |
| 2076473 | 12/1981 | United Kingdom . |
| 2171462 | 8/1986 | United Kingdom . |

*Primary Examiner*—Joseph A. Kaufman
*Attorney, Agent, or Firm*—Locke Liddell & Sapp LLP

[57] ABSTRACT

A food dispenser gun, comprising a tube holding a quantity of an extrudable food product, a piston sealingly engaged with an interior of the tube, a rod coupled to the piston and an incremental dispenser engaged with the rod and the tube, the incremental dispenser comprising a trigger, or an advancement lever operable to move the rod in a first direction relative to the incremental dispenser in response to the trigger and a retrograde lock operable to prevent the rod from moving in a second direction, wherein the advancement lever and the retrograde lock are completely enclosed by a housing of the incremental dispenser. Other systems, devices and methods are disclosed.

24 Claims, 3 Drawing Sheets

FOOD DISPENSER GUN

TECHNICAL FIELD OF THE INVENTION

The present invention relates generally to food dispensing devices and more particularly to a food dispensing gun for dispensing pureed food.

BACKGROUND OF THE INVENTION

In the foodservice industry, it is often required to extrude a length of food mixture, usually in the form of an uncooked product, so as to give a decorative effect. One example of such an extruder or press is an icing bag from which icing is extruded through a shaped nozzle by applying pressure to the bag. Another instance where extrusion is required is in the depositing of pastry dough onto a cooking surface in a decorative manner prior to cooking. Extrusion devices are generally required to apply high extrusion forces since the paste to be extruded is usually quite thick and stiff.

Dispensing guns for such extrusion applications are well known in the art and usually they comprise a gun which supports a cartridge for holding the foodstuff, the gun being provided with a lever actuated plunger that is adapted to engage and to move the cartridge piston toward the discharge end of the dispenser cartridge. In this way the axial movement of the piston exerts pressure on the paste formulation contained in the dispenser cartridge and displaces the paste through the discharge spout.

Many people, such as the elderly and those who have sustained injury to the mouth, cannot eat normal foods that need to be aggressively chewed. In such situations, it is desirable to puree, or grind, the food to a soft, paste-like consistency. Food prepared in such a manner meets the physical and nutritional requirements of the patient, however it may lack in aesthetic qualities. In fact, it may have such a low aesthetic appeal that the patient either will not or cannot eat it. Because the consistency of the pureed food is similar to that of uncooked pastry dough, prior art dispenser guns may be employed to serve such pureed food in attractive designs in order to enhance its palatability.

However, such food is generally served in a nursing home environment, where extremely strict health standards are maintained regarding food preparation and serving. Such regulations are necessarily strict because of the frailty of the health of a majority of nursing home residents. Because of this, the use of prior art trigger operated dispensing guns is not feasible. This is because all such trigger operated guns (which are the type which generate enough extrusion force to easily extrude the pureed food) include portions of their drive mechanisms exposed to the environment of use, such as notched rods and pivoting levers. These exposed drive mechanisms tend to trap food particles during use of the dispenser guns and are extremely hard to keep clean. Such prior art devices are therefore not usable in the extremely sanitary environment required for care of elderly or critically ill patients.

There is therefore a need in the prior art for a device capable of extruding pureed food and having all non-smooth portions of the drive mechanism located within the dispenser housing so that the dispenser gun may be kept clean and free of food debris at all times. The present invention is directed toward meeting these needs.

SUMMARY OF THE INVENTION

It is therefore the object of the present invention to provide a food dispenser gun having a trigger feed mechanism.

It is another object of the present invention to provide a food dispenser gun having high enough extrusion force to dispense food with a paste-like consistency.

It is a further object of the present invention to provide a food dispenser gun with all non-smooth portions of the drive mechanism located internal to the gun housing.

Other and further objects of the present invention will become apparent from a reading of the following description taken in conjunction with the appended claims.

In order to meet the forgoing objectives and to overcome the problems inherent in the prior art devices, the present invention provides a food dispenser gun using an advancement lever and a retrograde lock located completely within the gun housing.

In one form of the invention, a food dispenser gun is disclosed, comprising means for holding a quantity of an extrudable food product, a piston sealingly engaged with an interior of the means for holding, a rod coupled to the piston and an incremental dispenser engaged with the rod and the means for holding, the incremental dispenser comprising manual activation means, advancement means operable to move the rod in a first direction relative to the incremental dispenser in response to the manual activation means and a retrograde lock operable to prevent the rod from moving in a second direction, wherein the advancement means and the retrograde lock are completely enclosed by a housing of the incremental dispenser.

In another form of the invention, a food dispenser gun, comprising a tube adapted to hold a quantity of food, a piston sealingly engaged with an interior of the tube, a rod coupled to the piston and an incremental dispenser engaged with the rod and the tube, the incremental dispenser comprising a pistol grip with trigger wherein depression of the trigger is operative to activate the incremental dispenser, advancement means operable to move the rod in a first direction relative to the incremental dispenser in response to the trigger depression and a retrograde lock operable to prevent the rod from moving in a second direction, wherein the advancement means and the retrograde lock are completely enclosed by a housing of the incremental dispenser.

In another form of the invention, a food dispenser gun, comprising a tube adapted to receive a quantity of food, extrusion means coupled to a distal end of the tube and including an extrusion opening for extruding the food therethrough, a piston sealingly engaged with an exterior surface of the tube, the piston and the extrusion means defining a food holding chamber therebetween, a rod coupled to the piston and an incremental dispenser engaged with the rod and the tube, the incremental dispenser comprising manual activation means, advancement means operable to move the rod in a first direction relative to the incremental dispenser in response to the manual activation means and a retrograde lock operable to prevent the rod from moving in a second direction, wherein the advancement means and the retrograde lock are completely enclosed by a housing of the incremental dispenser.

BRIEF DESCRIPTION OF THE DRAWINGS

The novel features believed to be characteristic of the invention are set forth in the appended claims. For a more complete understanding of the present invention, and for further details and advantages thereof, reference is now made to the following Detailed Description taken in conjunction with the accompanying drawings, in which:

It is to be expressly understood, however, that the drawings are for purposes of illustration only and are not intended as a definition of the limits of the invention. Such definition is made only by the appended claims.

DETAILED DESCRIPTION OF THE DRAWINGS

Figure 1:
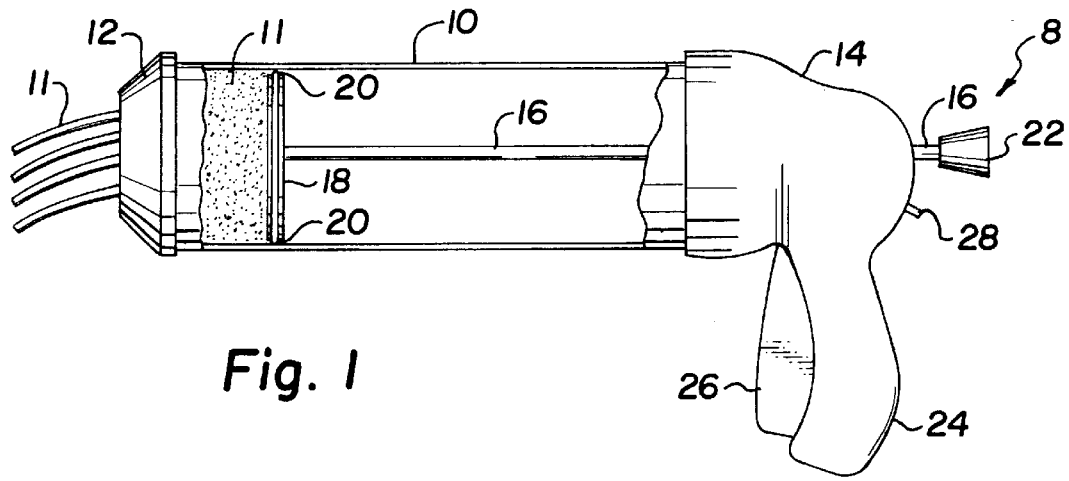
FIG. 1 is a plan view of an embodiment of the present invention.

The present invention relates to food dispenser guns. FIG. 1 is a plan view of a food dispenser gun according to the present invention, indicated generally at 8. The gun 8 includes a cylindrical tube 10 for containment of the pureed food 11 to be dispensed. Tube 10 is preferably made of a clear plastic so that it is lightweight, durable and transparent. The transparency of tube 10 allows the user to gauge the amount of food 11 remaining in the tube 10 and also allows easier visual inspection of the cleanliness of the inside of the tube 10 after washing. An end cap 12 is attached to the distal (dispensing) end of the tube 10. Various details concerning the design of the end cap 12 are discussed hereinbelow with reference to FIG. 3. The proximal end of tube 10 (opposite the end cap 12) is attached to an incremental dispenser unit 14. Incremental dispenser unit 14 includes a rod 16 extending therethrough. The rod 16 is preferably smooth and does not contain any teeth, notches, grooves or other ratcheting devices. This is so that the portion of rod 16 that extends from the incremental dispenser unit 14 may be easily kept clean and free of food particles and other debris.

The rod 16 is terminated at its distal end by a substantially disk shaped piston 18. Disk shaped piston 18 includes and integral circumferential wiper seal 20 which is sized so as to tightly engage with the inside surface of the tube 10 when the dispenser gun 8 is assembled. The wiping action provided by the seal 20 against the inside of the tube 10 when the piston 18 is incrementally advanced within the tube 10 prevents the food 11 from leaking to the back side of the piston 18. The rod 16 is terminated at its proximal end by a travel limiter 22. The incremental dispenser unit 14 further includes a pistol grip 24, including a trigger mechanism 26. A rod release button 28 also extends from the housing of the incremental dispenser unit 14.

In operation, when the rod release button 28 is depressed, the rod 16 may be extracted from the incremental dispenser unit 14 until the piston 18 rests near the incremental dispenser unit 14. Pureed food 11 is then loaded into either the distal or proximal end of the tube 10 and an appropriate end cap 12 is coupled to the tube 10, as well as the incremental dispenser unit 14. End cap 12 may have openings of various patterns (see FIG. 3) in order to impart a desired shape to the food 11 as is extruded through the openings in end cap 12. The user positions the dispenser gun 8 so that the end cap 12 is placed over the area where the food 11 is to be served and then depresses the trigger 26. Depression of the trigger 26 causes the movement of rod 16 toward the end cap 12 by an incremental amount. This movement of rod 16 necessarily causes piston 18 to move a like amount, reducing the size of the cavity in which the food 11 is contained and causing a measured quantity of food 11 to be extruded from openings in the end cap 12. Successive depressions of the trigger 26 cause the rod 16/piston 18 to be moved toward the end cap 12 in ratchet-like fashion. As will be explained hereinbelow in connection with FIG. 4, the internal mechanisms of the incremental dispenser unit prevent the rod 16 from retreating backward during successive triggerings. The rod 16 may only be moved backward when the rod release button 28 is depressed.

Figure 2:
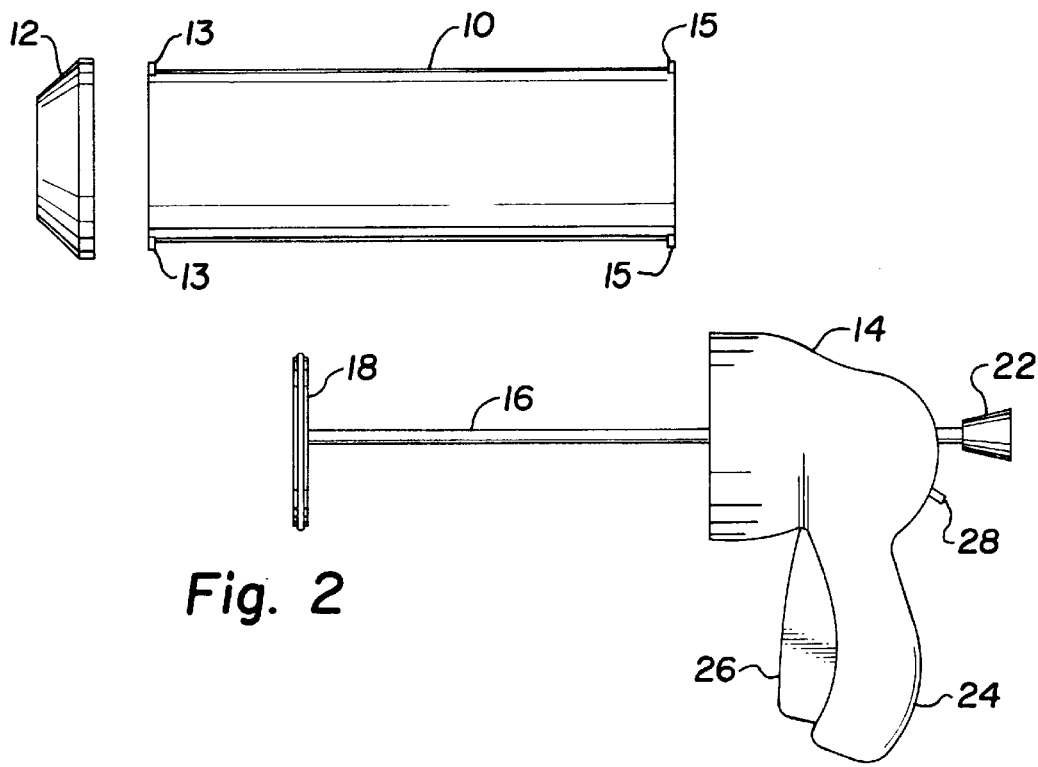
FIG. 2 is a plan view of an embodiment of the present invention disassembled.

Referring now to FIG. 2, the dispenser gun 8 is shown in disassembled form. The end cap 12 is preferably coupled to the distal end of tube 10 by a complementary key and keyway system. Tube 10 includes keys 13 on its distal end which mate with complementary keyways (not shown) in end cap 12, as is known in the art. Tube 10 may then be inserted into end cap 12 and locked in position by turning the tube 10 one-half revolution relative to the end cap 12. Other connection mechanisms may of course be employed, such as traditional screw threads. Similarly, the proximal end of tube 10 is preferably coupled to the incremental dispenser unit 14 by another complementary key and keyway system. Tube 10 includes further keys 15 on its proximal end which mate with complementary keyways (not shown) in incremental dispenser unit 14. Tube 10 may then be inserted into incremental dispenser unit 14 and locked in position by turning the tube 10 one-half revolution relative to the incremental dispenser unit 14. As with the tube 10/end cap 12 coupling, other connection mechanisms, such as traditional screw threads, may be employed.

Figure 3:
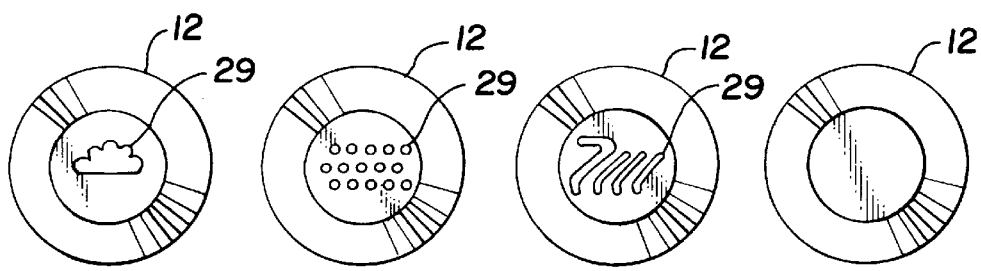
FIG. 3 is a plan view of several end caps used with the present invention.

FIG. 3 illustrates several configurations of end cap 12. The dispenser gun is preferably provided with an assortment of end caps 12 each having a different pattern of openings 29 through which the food 11 may be extruded. The various patterns of openings 29 each impart a different shape to the food 11 as it is extruded. In a preferred embodiment, these shapes are designed to resemble the shape of the food 11 before it was pureed, so as to give the meal a more natural appearance. An end cap 12 without any openings is also preferably provided for storage of the dispenser gun between dispensings and/or for use while loading food 11 into the tube 10.

Figure 4:
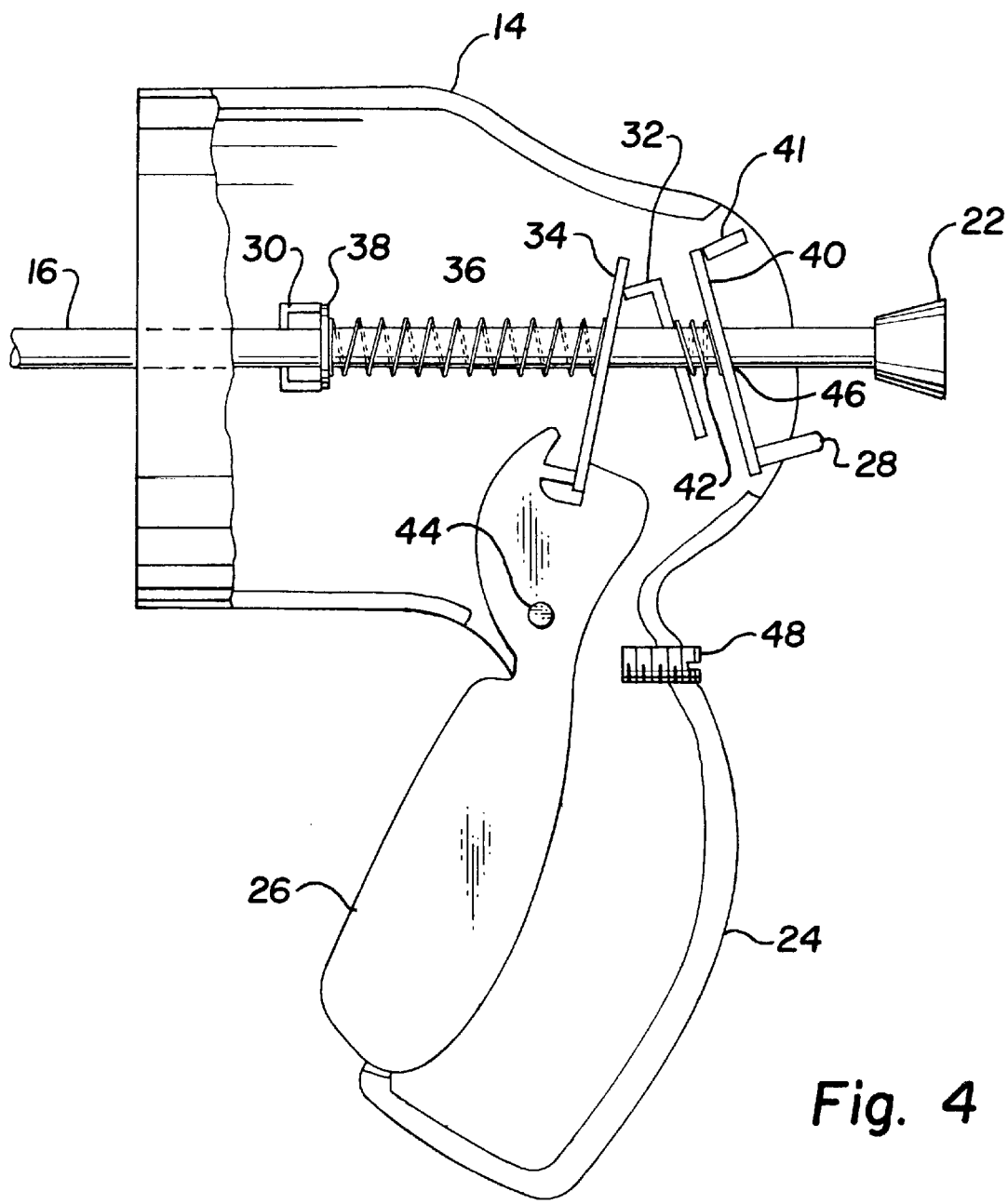
FIG. 4 is a cross-sectional view of the trigger and drive mechanism of an embodiment of the present invention.

Referring to FIG. 4, the internal advancement mechanism of the incremental dispenser unit 14 is shown. The rod 16 is held within dispenser unit 14 by two guides 30 and 32. Guides 30 and 32 are preferably formed integrally with the dispenser unit housing by any suitable process known in the art, such as injection molded plastic, for example. Rod 16 passes through an opening in advancement lever 34. Advancement lever 34 is preferably of a generally rectangular configuration with an opening therethrough only slightly larger than the cross-sectional area of the rod 16. A spring 36, coaxial with the rod 16, is positioned between the advancement lever 34 and a washer 38, the washer 38 being abutted against the guide 30. The spring 36 acts against the washer 38 to bias the advancement lever toward a position substantially perpendicular to the rod 16. A distal end of advancement lever 34 is engaged with an upper end of the trigger 26. The rod 16 also passes through an opening in a retrograde lock 40. Retrograde lock 40 is preferably of a generally rectangular configuration with an opening therethrough only slightly larger than the cross-sectional area of the rod 16. A spring 42, coaxial with the rod 16, is positioned between the guide 32 and the retrograde lock 40. The spring 42 acts against the guide 32 to bias the retrograde lock 40 away from a position substantially perpendicular to the rod 16. The rod release button engages a distal end of retrograde lock 40. The trigger 26 is situated so as to pivot around a post 44 when the trigger 26/pistol grip 24 is squeezed.

When the trigger 26 is squeezed, it pivots around the pivot 44 and acts upon the distal end of the advancement lever 34.

Such action causes the advancement lever 34 to move to the left in the drawing, pivoting at its engagement with guide 32 and compressing the spring 36. Friction between the advancement lever 34 and the rod 16 causes the rod 16 to move to the left also. When squeezing pressure is removed from the trigger 26, the compressed spring 36 acts against the washer 38 to return the advancement lever 34 to its original position. Movement of the advancement lever 34 necessarily returns the trigger 26 to its starting position. The rod 16 is prevented from moving backward (to the right) during the repositioning of the advancement lever 34 and the trigger 26 by the retrograde lock 40. The spring 42 forces the retrograde lock 40 to pivot around the fixed member 41 into a position where the rod 16 binds against the retrograde lock 40 at the point 46, preventing movement of the rod 16 in the rearward direction. The retrograde lock 40 does not interfere with forward movement of the rod 16 because friction from such movement at the point 46 urges the retrograde lock against the spring 42 and into a position where the retrograde lock 40 is substantially perpendicular to the rod 16. In this position, the rod 16 may move freely through the retrograde lock 40 without binding at point 46. Similarly, when rod release button 28 is depressed, it acts upon the distal end of retrograde lock 40, causing it to pivot around the member 41, compressing spring 42 and moving retrograde lock 40 into a position in which it does not bind upon the rod 16 when the rod 16 is moved backward. This allows the rod 16 to be pulled to the right far enough to allow room for food 11 to be loaded into the tube 10 prior to dispensing.

Another important feature of the present invention is the inclusion of the calibration screw 48 at the rear of the pistol grip 24. The distal end of calibration screw 48 acts to limit the travel of the trigger 26 when it is squeezed. This in turn limits the amount of travel of the advancement lever 34 and hence the rod 16. By advancing or backing out the calibration screw 48, different amounts of rod 16 travel may be provided for. Because the amount of travel of the rod 16 is directly related to the amount of food 11 dispensed, adjustment of the calibration screw 48 adjusts the amount of food 11 dispensed with each squeeze of the trigger 26. In a preferred embodiment of the present invention, the calibration screw 48 may be adjusted to provide for dispensing of from 0 to 1 ¾ ounces of food 11. Such adjustment is very important in applications such as nursing home food preparation, where the patients are under strict dietary requirements and limitations.

Figure 5:
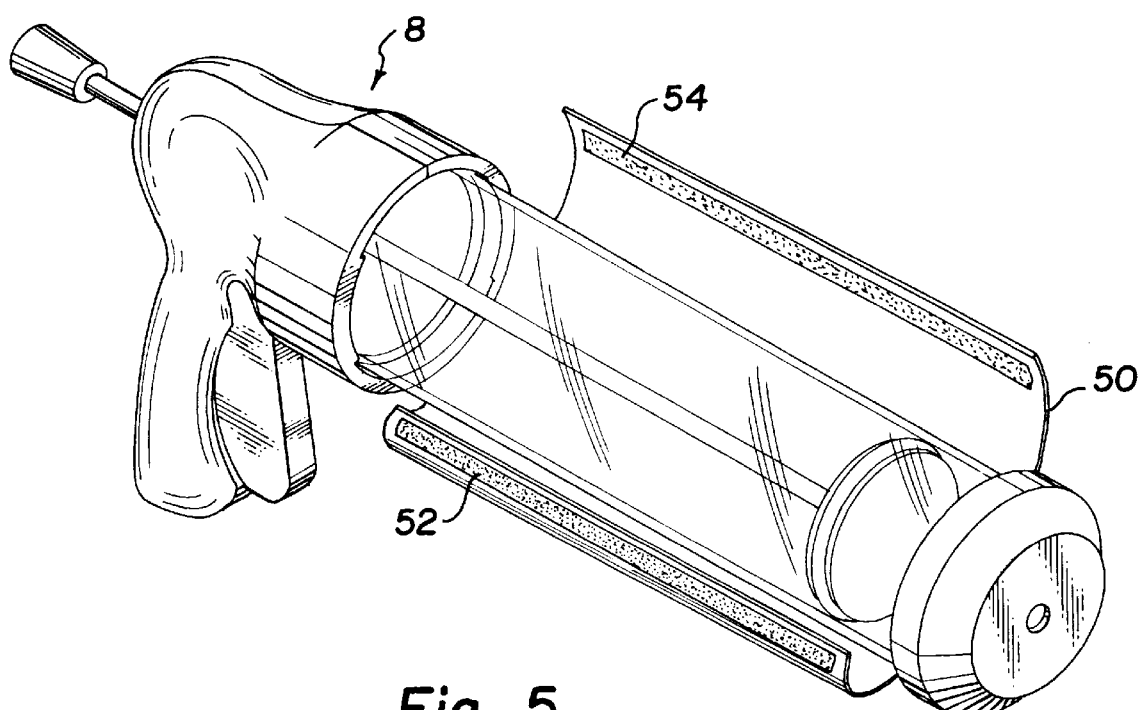
FIG. 5 is a perspective view of an embodiment of the food dispenser gun of the present invention including an insulating jacket of the present invention.

Referring now to FIG. 5, another feature of the invention is an insulating jacket 50 that may be wrapped around the tube 10 when heated or chilled food is being dispensed in order to maintain the temperature of the food. The jacket 50 may be made of any insulating material and may be provided with hook and loop closures 52 and 54 to facilitate installation and removal from the tube 10.

It will be appreciated by those skilled in the art that the present design for a food dispensing gun represents an improvement over the current state of the art. Specifically, the dispenser gun 8 is designed so that the exterior of the device is smooth and has a minimum number of exterior protrusions. A serious problem with prior art designs is the location of much of their drive mechanisms exterior to the gun housing. These surfaces trap dirt and food particles during use and are very difficult to keep clean due to their complex geometries. This has proven to be a particular problem in the care of elderly or infirm patients, where the maintenance of antiseptic environments is of the greatest importance. The dispenser gun 8 of the present invention has a smooth exterior which is made possible by the novel arrangement of its drive mechanisms within the housing 14. The only protrusions are the very small rod release button 28 and the proximal end of the rod 16. Both of these protrusions have very simple geometries and are relatively easy to keep clean by simply wiping them with a clean cloth. For this reason, the food dispenser gun of the present invention represents a tremendous improvement over the prior art.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the appended claims.

What is claimed is:

1. A food dispenser gun, comprising:
   a housing;
   a removable and reusable container to hold a quantity of an extrudable food product said removable and reusable container removably engaged with said housing;
   a piston sealingly engaged with an interior of said removable and reusable container;
   a rod coupled to said piston; and
   an incremental dispenser engaged with said rod and said removable and reusable container, said incremental dispenser comprising:
      a manual activator;
      a member operable to move said rod in a first direction relative to said incremental dispenser in response to said manual activator; and
      a retrograde lock operable to prevent said rod from moving in a second direction;
   wherein said advancement means and said retrograde lock are completely enclosed by said housing of said incremental dispenser.

2. The dispenser gun of claim 1, wherein said removable and reusable container is a clear plastic tube.

3. The dispenser gun of claim 1 further comprising:
   seal means circumferentially engaged with said piston.

4. The dispenser gun of claim 1, further comprising:
   rod release means protruding from said housing and operable when activated to allow movement of said rod in said second direction.

5. The dispenser gun of claim 1 wherein said member comprises:
   a lever having an opening therethrough for passage of said rod, said opening being slightly larger than a cross-sectional dimension of said rod;
   a distal end of said lever being engaged with said manual activator;
   said lever pivoting against a first fixed guide at a point near a proximal end of said lever in response to said manual activator;
   said pivoting causing said opening to bind against said rod and move said rod in said first direction.

6. The dispenser gun of claim 5, wherein said member further comprises:
   a spring abutting a second fixed guide and operable to bias said lever toward a position substantially perpendicular to said rod.

7. The dispenser gun of claim 1 wherein said retrograde lock comprises:

a lever having an opening therethrough for passage of said rod, said opening being slightly larger than a cross-sectional dimension of said rod;

a spring abutting a first fixed guide and operable to bias said lever away from a position substantially perpendicular to said rod.

8. The dispenser gun of claim 7, further comprising:

rod release means protruding from said housing and operable when activated to bias said lever toward a position substantially perpendicular to said rod.

9. The food dispenser gun of claim 1, further comprising a means for controlling how much of said extrudable food product is dispensed, said means for controlling being adjustable and determining said manual activator's travel length.

10. The food dispenser gun of claim 1, further comprising an extrusion means coupled to said removable and reusable container opposite said housing, said extrusion means including an extrusion opening for extruding said extrudable food product therethrough.

11. A food dispenser gun, comprising:

a food a tube adapted to hold said food;

a piston sealingly engaged with an interior of said tube;

a rod coupled to said piston; and an incremental dispenser engaged with said rod and said tube, said incremental dispenser comprising:
  a pistol grip with trigger wherein depression of said trigger is operative to activate said incremental dispenser;
  advancement means operable to move said rod in a first direction relative to said incremental dispenser in response to said trigger depression, said advancement means comprising:
    a lever having an opening therethrough for passage of said rod, said opening being slightly larger than a cross-sectional dimension of said rod;
    a distal end of said lever being attached to said trigger;
    said lever pivoting against a first fixed guide at a point near a proximal end of said lever in response to said trigger depression; and
    said pivoting causing said opening to bind against said rod and move said rod in said first direction; and
  a retrograde lock operable to prevent said rod from moving in a second direction;
wherein said advancement means and said retrograde lock are completely enclosed by a housing of said incremental dispenser.

12. The food dispenser gun of claim 11, further comprising:

rod release means protruding from said housing and operable when activated to allow movement of said rod in said second direction.

13. The food dispenser gun of claim 11, wherein said advancement means further comprises:

a spring abutting a second fixed guide and operable to bias said lever toward a position substantially perpendicular to said rod.

14. The food dispenser gun of claim 11, further comprising a calibration screw, wherein said calibration screw is mounted in said pistol grip and engages said trigger limiting the travel of said trigger thereby controlling how much of said food is dispensed.

15. The food dispenser gun of claim 11, further comprising an first extrusion cap and a second extrusion cap, said first extrusion cap including an extrusion opening of a different shape from an extrusion opening in said second extrusion cap thereby imparting a different shape to said food product when dispensed, wherein either said first extrusion cap or said second extrusion cap is coupled to said tube opposite said housing depending on a desired shape of said food product.

16. A food dispenser gun, comprising:

a tube adapted to receive a quantity of food;

a first extrusion cap and a second extrusion cap, wherein either said first extrusion cap or said second extrusion cap is coupled to a distal end of said tube and said first extrusion cap includes a first extrusion opening and said second extrusion cap includes a second extrusion opening, said first extrusion opening having a different shape than said second extrusion opening for extruding said food into an appropriate shape therethrough;

a piston sealingly engaged with an interior surface of said tube, said piston and said extrusion means defining a food holding chamber therebetween;

a rod coupled to said piston; and an incremental dispenser engaged with said rod and said tube, said incremental dispenser comprising:
  manual activation means;
  advancement means operable to move said rod in a first direction relative to said incremental dispenser in response to said manual activation means; and
  a retrograde lock operable to prevent said rod from moving in a second direction;
wherein said advancement means and said retrograde lock are completely enclosed by a housing of said incremental dispenser.

17. The food dispenser gun of claim 16, wherein said manual activation means comprises a pistol grip with trigger wherein depression of said trigger is operative to activate said incremental dispenser.

18. The food dispenser gun of claim 16, further comprising:

rod release means protruding from said housing and operable when activated to allow movement of said rod in said second direction.

19. The food dispenser gun of claim 16, wherein said advancement means comprises:

a lever having an opening therethrough for passage of said rod, said opening being slightly larger than a cross-sectional dimension of said rod;

a distal end of said lever being engaged with said trigger;

said lever pivoting against a first fixed guide at a point near a proximal end of said lever in response to said trigger depression;

said pivoting causing said opening to bind against said rod and move said rod in said first direction.

20. The food dispenser gun of claim 19, wherein said advancement means further comprises:

a spring abutting a second fixed guide and operable to bias said lever toward a position substantially perpendicular to said rod.

21. The food dispenser gun of claim 16, wherein said retrograde lock comprises:

a lever having an opening therethrough for passage of said rod, said opening being slightly larger than a cross-sectional dimension of said rod;

a spring abutting a first fixed guide and operable to bias said lever away from a position substantially perpendicular to said rod.

22. The food dispenser gun of claim 21, further comprising:

rod release means protruding from said housing and operable when activated to bias said lever toward a position substantially perpendicular to said rod.

23. The method of dispensing an extrudable food product comprising the steps of:

a) providing a housing;

b) providing a reusable tube to hold said extrudable food product, said reusable tube removably coupled to said housing;

c) providing a piston sealingly engaged with an interior of said tube;

d) providing a rod coupled to said piston;

e) providing an incremental dispenser engaged with said rod and said tube, said incremental dispenser including a pistol grip with a trigger wherein depression of said trigger is operative to activate said incremental dispenser, advancement means operable to move said rod in a first direction relative to said incremental dispenser in response to said trigger depression, and a retrograde lock operable to prevent said rod from moving in a second direction; and f) depressing said trigger to cause said extrudable food product to be dispensed.

24. The method of claim 23, further comprising the step of:

g) controlling the amount of extrudable food product dispensed with a calibration screw, said calibration screw engaging said trigger at an end of said trigger's travel.

* * * * *